United States Patent
Lee

(10) Patent No.: US 10,856,118 B2
(45) Date of Patent: Dec. 1, 2020

(54) METHOD AND APPARATUS FOR TRANSMITTING INFORMATION USING V2X COMMUNICATION IN A WIRELESS COMMUNICATION SYSTEM

(71) Applicant: LG ELECTRONICS INC., Seoul (KR)

(72) Inventor: Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/461,760

(22) PCT Filed: Nov. 20, 2017

(86) PCT No.: PCT/KR2017/013196
§ 371 (c)(1),
(2) Date: May 16, 2019

(87) PCT Pub. No.: WO2018/093220
PCT Pub. Date: May 24, 2018

(65) Prior Publication Data
US 2019/0364402 A1 Nov. 28, 2019

Related U.S. Application Data

(60) Provisional application No. 62/423,770, filed on Nov. 18, 2016.

(51) Int. Cl.
*H04J 3/24* (2006.01)
*H04W 4/40* (2018.01)
(Continued)

(52) U.S. Cl.
CPC ............... *H04W 4/40* (2018.02); *H04W 4/80* (2018.02); *H04W 4/90* (2018.02); *H04W 84/005* (2013.01); *H04W 84/18* (2013.01); *H04W 88/04* (2013.01)

(58) Field of Classification Search
USPC ....... 370/229, 230, 246, 252, 315, 316, 328, 370/351, 352, 389, 393, 400, 428, 474,
(Continued)

(56) References Cited

U.S. PATENT DOCUMENTS 8,902,818 B2 * 12/2014 Chu .................... H04W 76/10
370/328
10,575,181 B2 * 2/2020 Lei ....................... H04W 48/04
(Continued)

FOREIGN PATENT DOCUMENTS

KR  10-2010-0107800 A  10/2010
KR     10-1663985 B1   10/2016

OTHER PUBLICATIONS

3GPP TR 22.886 V1.0.0, "3GPP; TSG SA; Study on enhancement of 3GPP Support for 5G V2X Services (Release 15)", Sep. 22, 2016, see sections 5.2.1.2-5.2.1.3.

(Continued)

*Primary Examiner* — Nguyen H Ngo
(74) *Attorney, Agent, or Firm* — Dentons US LLP

(57) ABSTRACT

Disclosed herein is a method for transmitting information for a neighboring vehicle UE of a first vehicle UE using V2X (Vehicle-to-Everything) communication in a wireless communication system.
The method includes receiving a first V2X message from at least one the neighboring vehicle UE; generating a second V2X message based on the received first V2X message when an accident triggering an eCall (emergency call) occurs, checking whether the second V2X message is ready to be transmitted to the first network entity; and transmitting at least one of the eCall, a minimum set of data (MSD) forming the data component of the eCall, or the second V2X message to the first network entity according to the result of the check.

12 Claims, 10 Drawing Sheets

(51) Int. Cl.
*H04W 4/90* (2018.01)
*H04W 4/80* (2018.01)
*H04W 84/00* (2009.01)
*H04W 84/18* (2009.01)
*H04W 88/04* (2009.01)

(58) Field of Classification Search
USPC .................. 370/475, 492, 501; 455/404.1, 7
See application file for complete search history.

(56) References Cited

U.S. PATENT DOCUMENTS

| | | | | |
|---|---|---|---|---|
| 2012/0195260 | A1* | 8/2012 | Dietz | H04L 65/4061 370/328 |
| 2013/0309994 | A1* | 11/2013 | Hellwig | H04W 4/90 455/404.2 |
| 2014/0011470 | A1* | 1/2014 | D'Amato | G08B 25/009 455/404.1 |
| 2015/0264548 | A1* | 9/2015 | Lee | H04W 4/90 370/335 |
| 2017/0072851 | A1* | 3/2017 | Shenoy | B60Q 9/008 |
| 2017/0374538 | A1* | 12/2017 | Gellens | H04W 4/90 |

OTHER PUBLICATIONS

3GPP TS 22.101 V14.4.0, "3GPP; TSG SA; Service aspects; Service principles (Release 14)", Sep. 30, 2016, see sections 3.1, 10.7, A.27.3-A.27.4.

Ericsson, "V2x message transport mechanism over LTE-Uu reference point", S2-165508, 3GPP TSG-SA WG2 Meeting #117, Kaohsiung City, Taiwan, Oct. 17-21, 2016, see sections 2.1, 3.

* cited by examiner

[Figure 1]
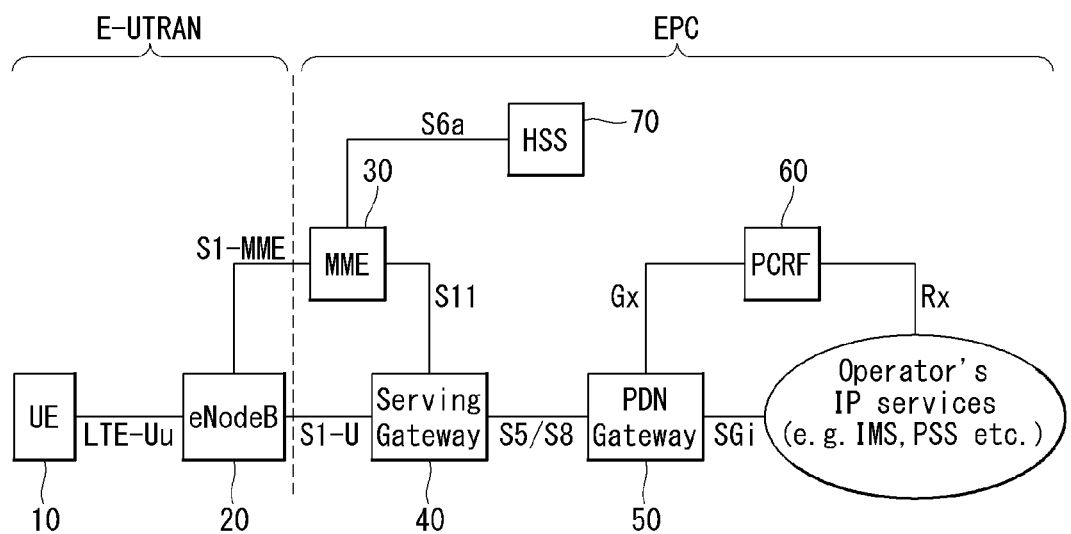

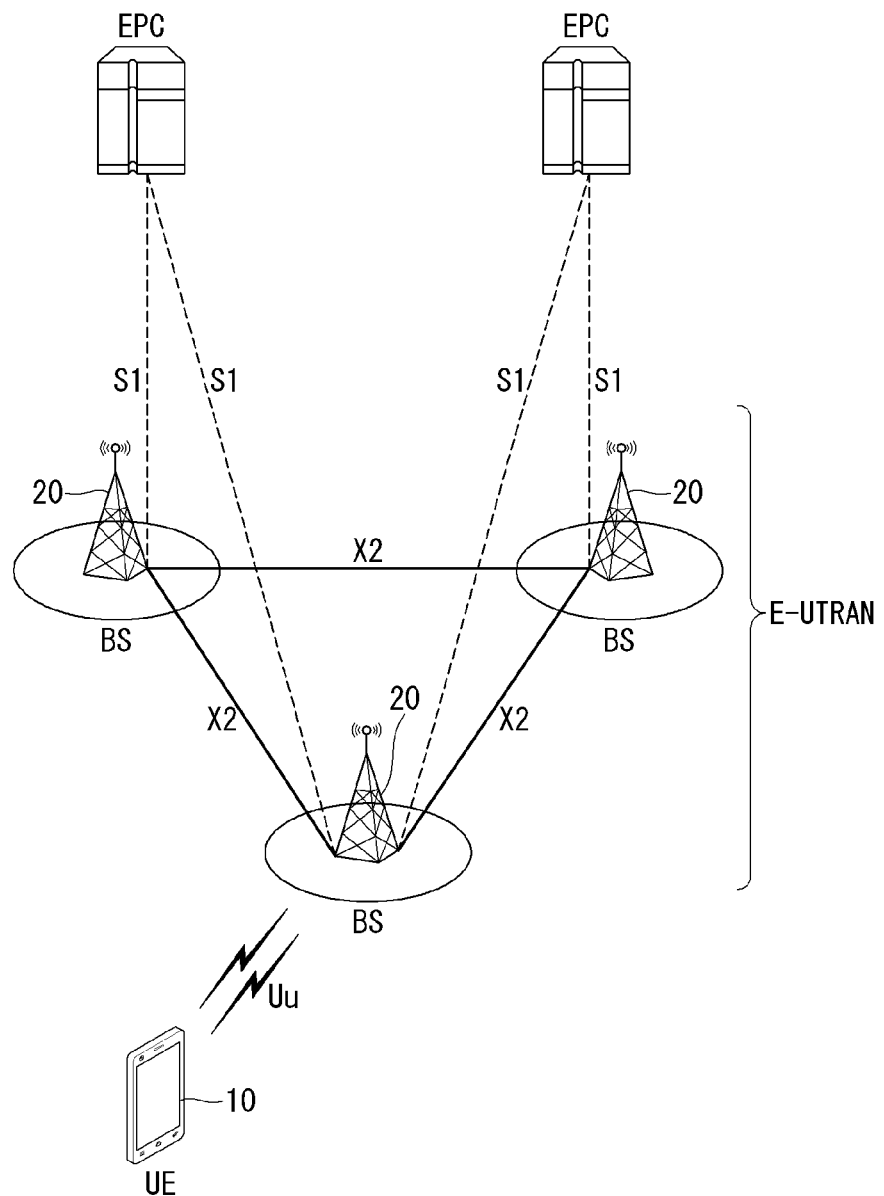
[Figure 2]

[Figure 3]
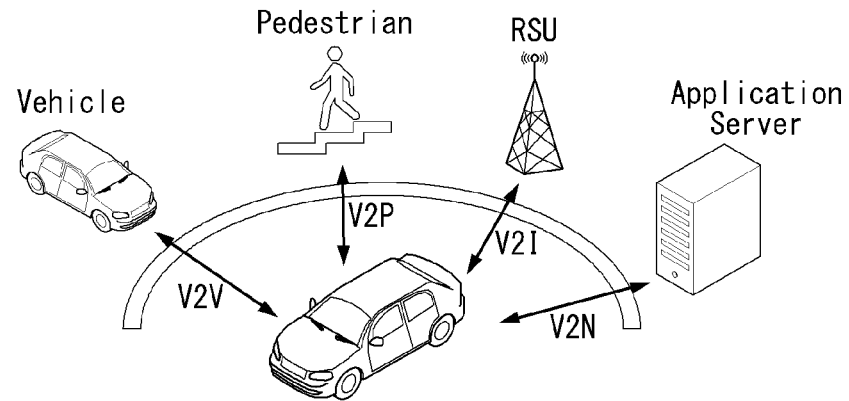
[Figure 4]
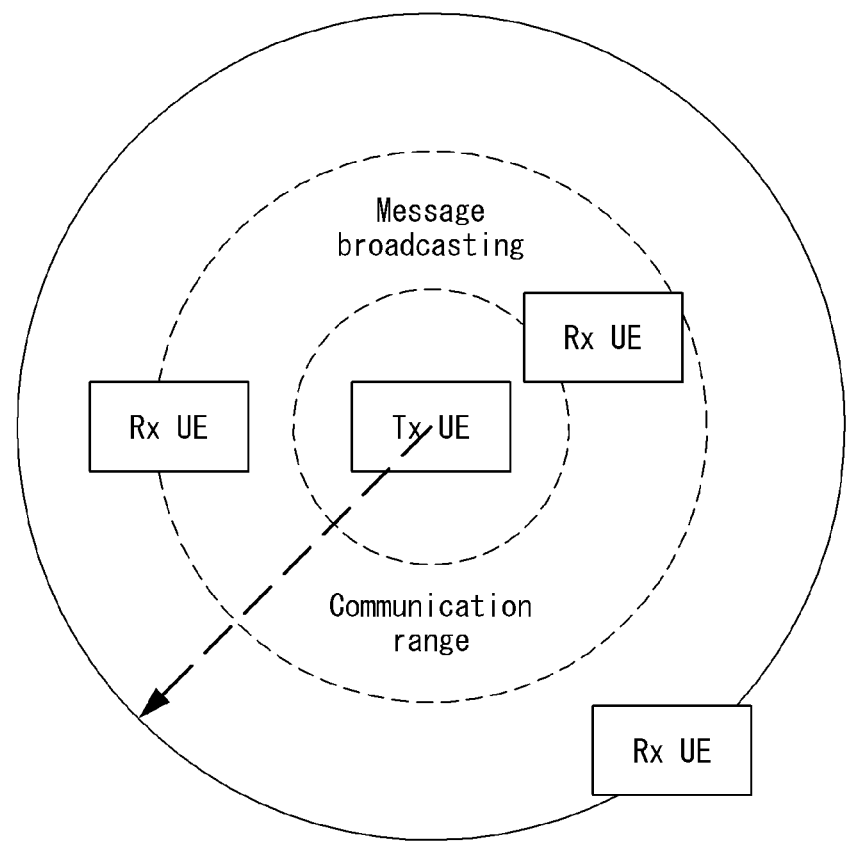

[Figure 5]
(a)
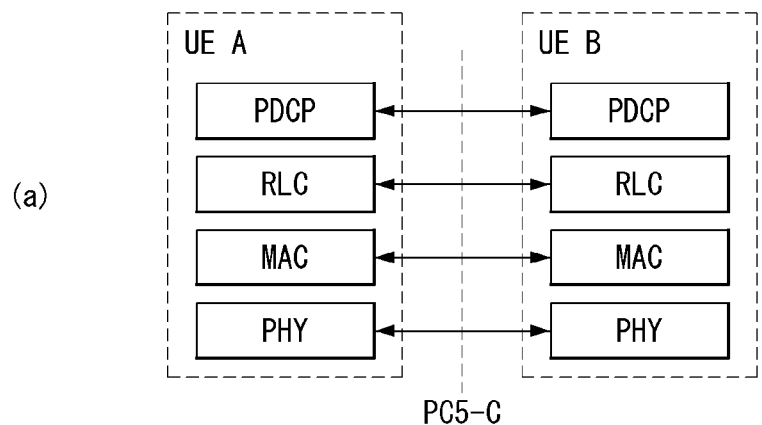
(b)
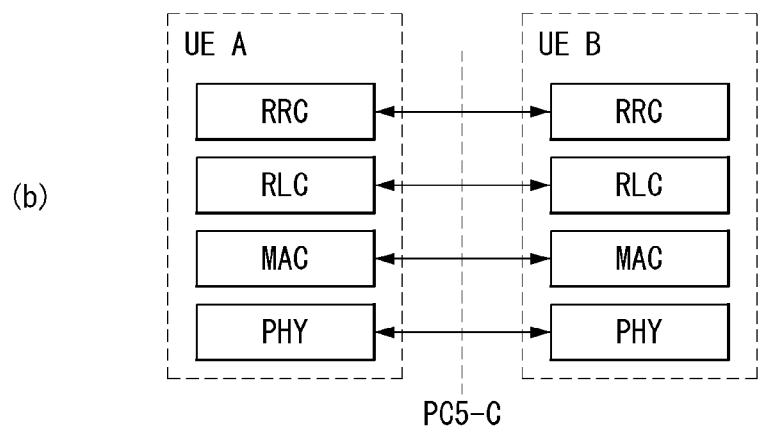

[Figure 6]
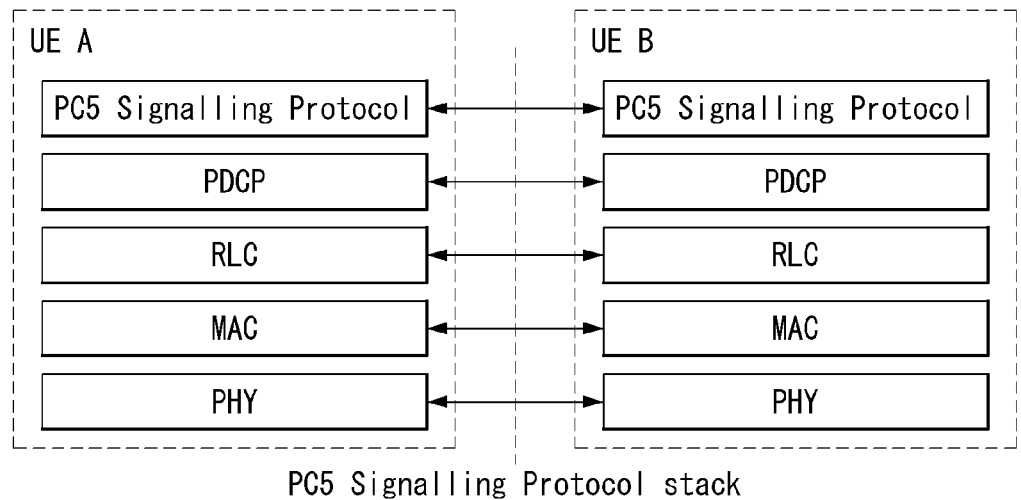
PC5 Signalling Protocol stack
[Figure 7]
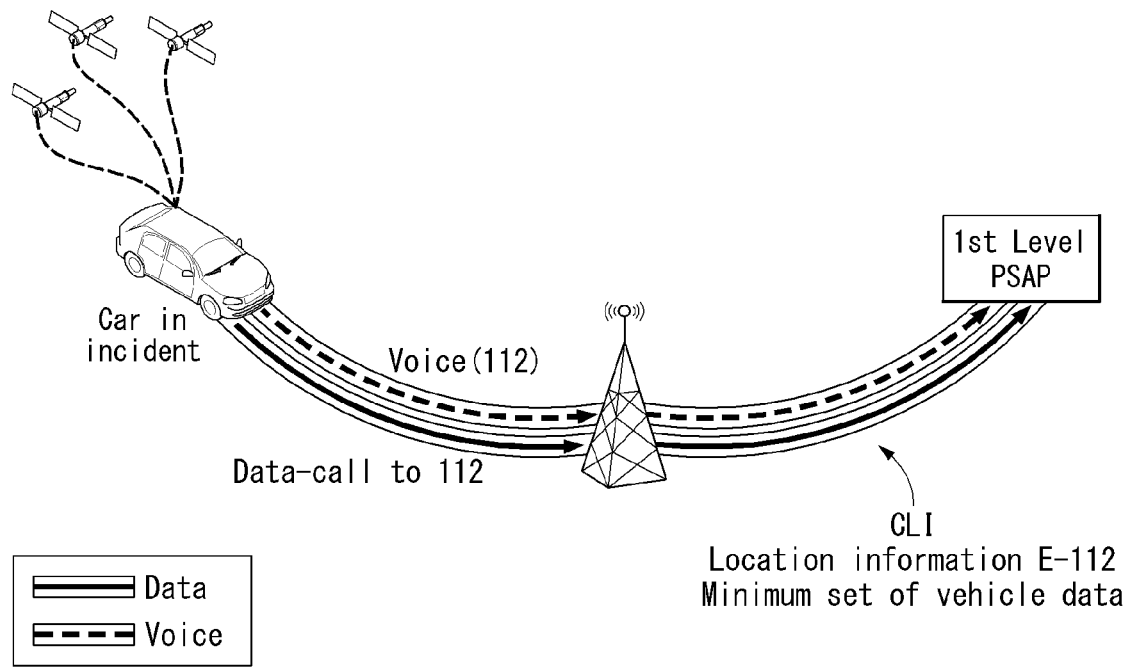

[Figure 8]
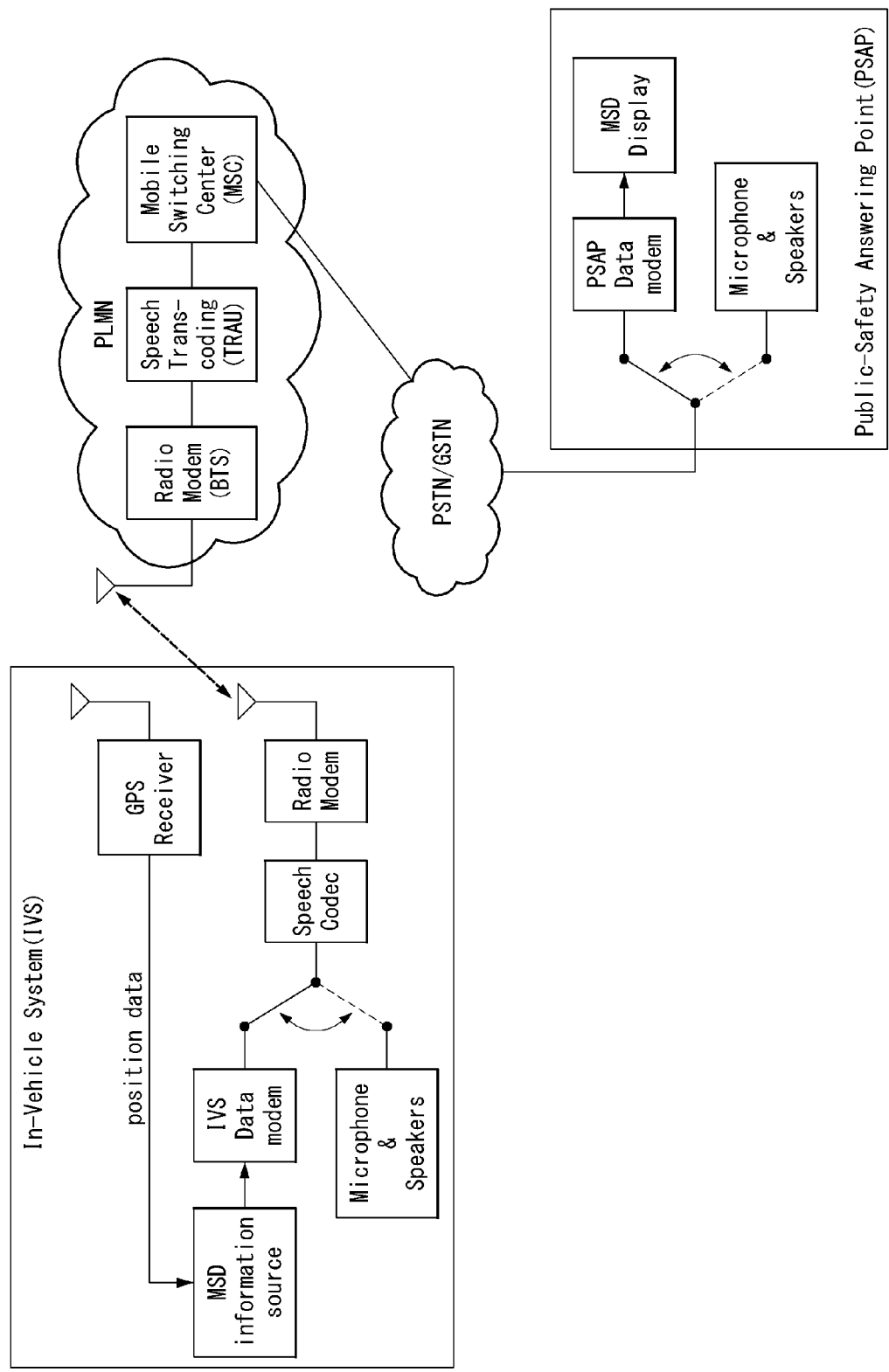

[Figure 9]
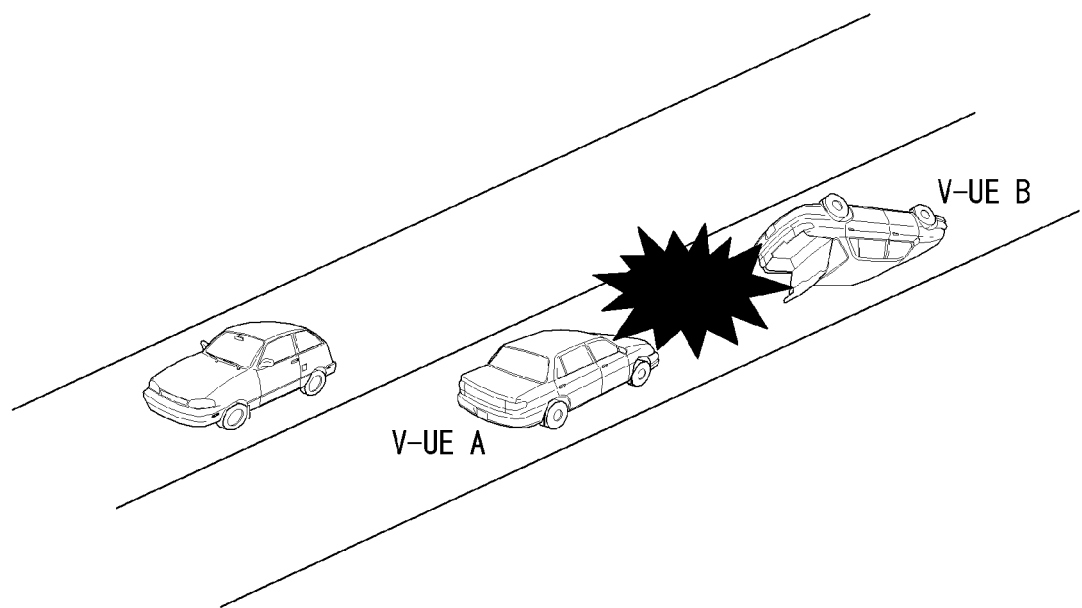

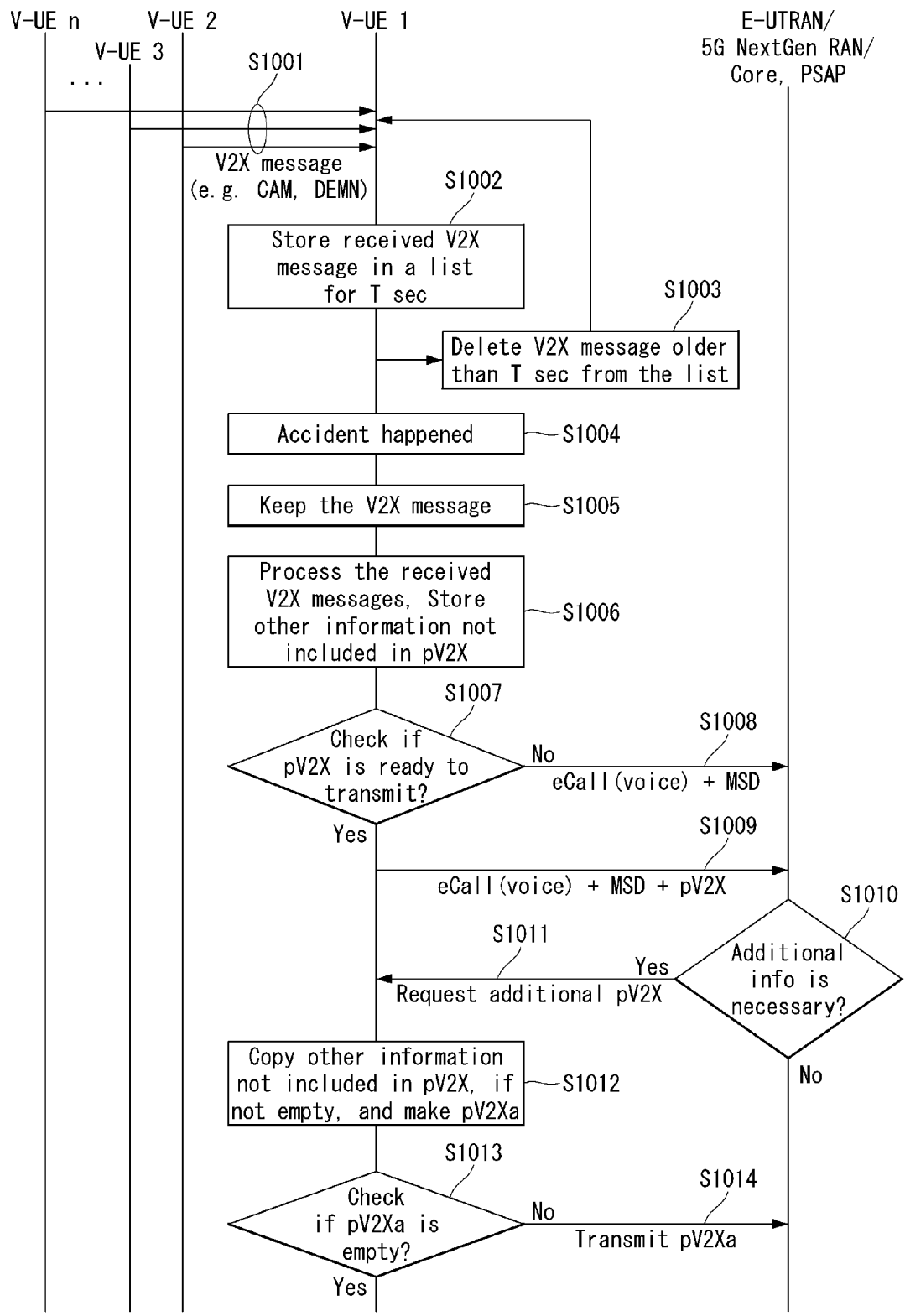
[Figure 10]

[Figure 11]
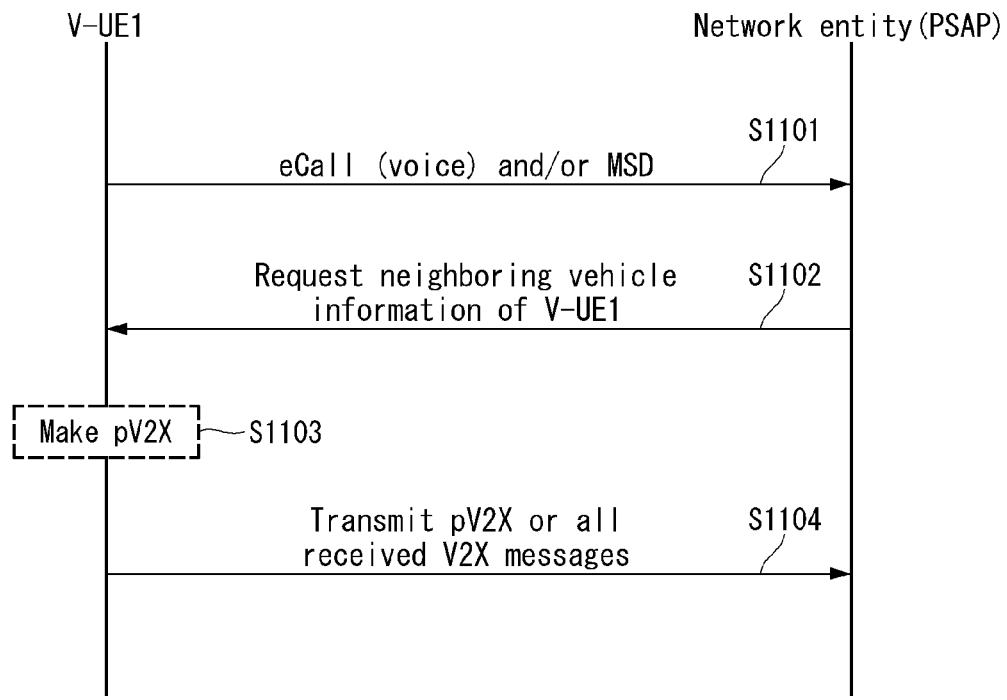

[Figure 12]
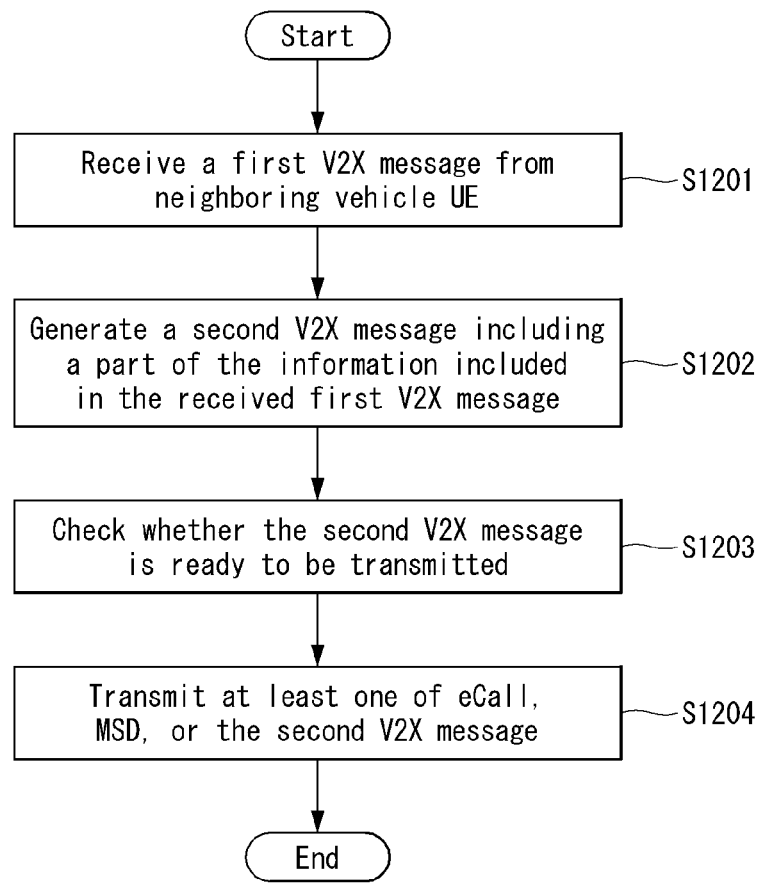
[Figure 13]
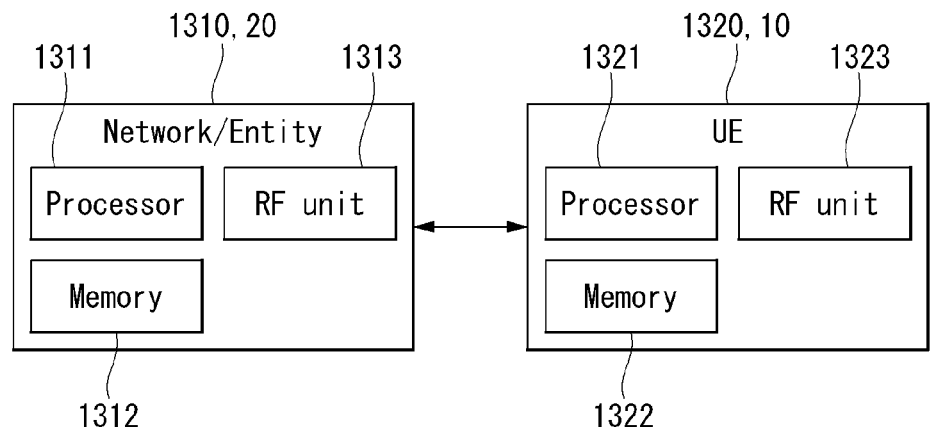

METHOD AND APPARATUS FOR TRANSMITTING INFORMATION USING V2X COMMUNICATION IN A WIRELESS COMMUNICATION SYSTEM

CROSS-REFERENCE TO RELATED APPLICATIONS

This application is the National Stage filing under 35 U.S.C. 371 of International Application No. PCT/KR2017/013196, filed on Nov. 20, 2017, which claims the benefit of U.S. Provisional Application No. 62/423,770, filed on Nov. 18, 2016, the contents of which are all hereby incorporated by reference herein in their entirety.

TECHNICAL FIELD

This specification relates to a method and apparatus for transmitting information using Vehicle-to-Everything (V2X) communication.

BACKGROUND ART

Mobile communication systems have been developed to provide voice services while assuring users' activities. However, the mobile communication systems have been expanding their areas up to data services as well as voice services, and a current explosive growth of traffic caused a lack of resources, so that users require further advanced mobile communication systems offering quicker services.

As requirements for next-generation mobile communication systems, covering drastically increasing data traffic, a significant increase in transmission rate per user, much more linked devices, very low end-to-end latency, and high energy efficiency should be supported. To this end, various techniques are under research, such as small cell enhancement, dual connectivity, massive MIMO (Multiple Input Multiple Output), in-band full duplex, NOMA (non-orthogonal multiple access), super wideband support, or device networking.

SUMMARY OF INVENTION

Technical Problem

The present specification provides a method for transmitting information related to neighboring V-UEs obtained through a V2X message to a PSAP via an eCall system.

Objects to be achieved in this specification are not limited to the aforementioned advantages, and those skilled in the art to which the present invention pertains may evidently understand other objects from the following description.

Technical Solution

In this specification, a method for transmitting information for a neighboring vehicle UE of a first vehicle UE using V2X (Vehicle-to-Everything) communication in a wireless communication system, the method performed by the first vehicle UE comprising: receiving a first V2X message from at least one the neighboring vehicle UE; generating a second V2X message based on the received first V2X message when an accident triggering an eCall (emergency call) occurs, wherein the second V2X message includes a part of the first V2X message and control information associated with the at least one neighboring vehicle UE, wherein the control information includes at least one of an identifier (ID) that identifies a V2X application layer or an identifier (ID) that identifies the at least one neighboring vehicle UE; checking whether the second V2X message is ready to be transmitted to the first network entity; and transmitting at least one of the eCall, a minimum set of data (MSD) forming the data component of the eCall, or the second V2X message to the first network entity according to the result of the check.

Furthermore, in this specification, if the second V2X message is not ready to be transmitted, the eCall and the MSD are transmitted to the first network entity, if the second V2X message is ready to be transmitted, the eCall, the MSD and the second V2X message are transmitted to the first network entity.

Furthermore, in this specification, the method further comprising: storing the received first V2X message in a specific list for a first time;

Furthermore, in this specification, the method further comprising: deleting the V2X message stored in the specific list after the first time.

Furthermore, in this specification, the method further comprising: copying the first V2X message stored in the specific list, the second V2X message is generated based on the copied first V2X message.

Furthermore, in this specification, the method further comprising: maintaining the first V2X message stored in the specific list for a second time from the time an accident happened.

Furthermore, in this specification, the method further comprising: storing other information included in the received first V2X message except for the part of information included in the received first V2X message.

Furthermore, in this specification, the method further comprising: receiving a request message requesting additional information associated with the second V2X message from the first network entity.

Furthermore, in this specification, the method further comprising: generating a third V2X message including the other information if the stored other information exists; and transmitting the generated third V2X message to the first network entity.

Furthermore, in this specification, the generating the third V2X message comprising: copying the other information; and generating the third V2X message using the copied other information.

Furthermore, in this specification, the first network entity is a Public Safety Answering Point (PSAP).

Furthermore, in this specification, the minimum set of data (MSD) includes at least one of a vehicle identification number (VIN) identifying a vehicle UE, vehicle location information indicating the location of the vehicle UE, or time stamp information related to the time of occurrence of the accident or the event.

Furthermore, in this specification, a first vehicle UE for transmitting information for a neighboring vehicle UE of a first vehicle UE using V2X (Vehicle-to-Everything) communication in a wireless communication system, comprising: a radio frequency (RF) unit for transceiving a radio signal; and a processor functionally connected to the RF unit, wherein the processor is configured to perform: generating a second V2X message based on the received first V2X message when an accident triggering an eCall (emergency call) occurs, wherein the second V2X message includes a part of the first V2X message and control information associated with the at least one neighboring vehicle UE, wherein the control information includes at least one of an identifier (ID) that identifies a V2X application layer or an identifier (ID) that identifies the at least one neighboring vehicle UE; checking whether the second V2X message is ready to be transmitted to the first network entity; and transmitting at least one of the eCall, a minimum set of data (MSD) forming the data component of the eCall, or the second V2X message to the first network entity according to the result of the check.

Advantageous Effects

The present specification can provide information related to neighboring V-UEs obtained through a V2X message with a PSAP via an eCall system.

Advantages to be obtained in this specification are not limited to the aforementioned advantages, and those skilled in the art to which the present invention pertains may evidently understand other advantages from the following description.

DESCRIPTION OF DRAWINGS

FIG. 1 is a view illustrating an Evolved Packet System which is associated with the Long Term Evolution (LTE) system to which the present invention may be applied.

FIG. 2 illustrates a wireless communication system to which the present invention is applied.

FIG. 3 illustrates types of V2X applications to which the present invention may be applied.

FIG. 4 illustrates Broadcast-based V2V communications to which the present invention may be applied.

FIG. 5a illustrates user-Plane protocol stack for sidelink communication to which the present invention may be applied.

FIG. 5b illustrates control-Plane protocol stack for SBCCH to which the present invention may be applied.

FIG. 6 illustrates control-Plane protocol stack for one-to-one sidelink communication to which the present invention may be applied.

FIG. 7 illustrates an example of the eCall system.

FIG. 8 illustrates an example of eCall system within cellular system architecture.

FIG. 9 illustrates an example of a situation where V-UE B got an accident that triggered an eCall.

FIG. 10 is a flowchart illustrating an example of a method for transmitting information related to neighboring vehicles through eCall.

FIG. 11 is another flowchart illustrating an example of a method for transmitting information related to neighboring vehicles through eCall.

FIG. 12 is a block diagram illustrating an example of a method for transmitting information related to neighboring vehicles through eCall.

FIG. 13 is a block diagram illustrating a wireless device in which methods as proposed herein may be implemented.

MODE FOR INVENTION

Reference will now be made in detail to the preferred embodiments of the present invention, examples of which are illustrated in the accompanying drawings. The detailed description set forth below in connection with the appended drawings is a description of exemplary embodiments and is not intended to represent the only embodiments through which the concepts explained in these embodiments may be practiced. The detailed description includes details for the purpose of providing an understanding of the present invention. However, it will be apparent to those skilled in the art that these teachings may be implemented and practiced without these specific details.

In some instances, known structures and devices are omitted, or are shown in block diagram form focusing on important features of the structures and devices, so as not to obscure the concept of the present invention.

In the embodiments of the present invention, the enhanced Node B (eNode B or eNB) may be a terminal node of a network, which directly communicates with the terminal. In some cases, a specific operation described as performed by the eNB may be performed by an upper node of the eNB. Namely, it is apparent that, in a network comprised of a plurality of network nodes including an eNB, various operations performed for communication with a terminal may be performed by the eNB, or network nodes other than the eNB. The term "eNB" may be replaced with a term, such as a "fixed station", a "base station (BS)", a "Node B", a "base transceiver system (BTS)", an "access point (AP)", a "macro eNB or master eNB (MeNB)" or a "secondary eNB (SeNB)." The term "UE" may be replaced with a term, such as a "terminal", a "mobile station (MS)", a "user terminal (UT)", a "mobile subscriber station (MSS)", a "subscriber station (SS)", a "station (STA)", an "advanced mobile station (AMS)", a "wireless terminal (WT)", a machine-type communication (MTC) device", a "machine-to-machine (M2M) device", a "device-to-device (D2D) device" or a wireless device.

In the embodiments of the present invention, "downlink (DL)" refers to communication from the eNB to the UE, and "uplink (UL)" refers to communication from the UE to the eNB. In the downlink, transmitter may be a part of eNB, and receiver may be part of UE. In the uplink, transmitter may be a part of UE, and receiver may be part of eNB.

Specific terms used for the embodiments of the present invention are provided to aid in understanding of the present invention. These specific terms may be replaced with other terms within the scope and spirit of the present invention.

The embodiments of the present invention may be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), LTE-Advanced Pro (LTE-A Pro), 5G New Radio (NR), and 3GPP2. Steps or parts that are not described to clarify the technical features of the present invention may be supported by those documents. Furthermore, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), 'non-orthogonal multiple access (NOMA)', etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved UMTS (E-UMTS) using E-UTRA. 3GPP LTE employs OFDMA for downlink and SC-FDMA for uplink.

LTE-A is an evolution of 3GPP LTE. LTE-A pro is an evolution of 3GPP LTE-A. 5G NR is a revolution of 3GPP LTE-A that will be implemented by OFDMA or its variants.

For the purposes of the present invention, the following abbreviations apply.

ACK Acknowledgement
AM Acknowledged Mode
AMBR Aggregate Maximum Bit Rate
ARQ Automatic Repeat Request
AS Access Stratum
BCCH Broadcast Control Channel
BCH Broadcast Channel
BM-SC Broadcast and Multicast Service Center
BSR Buffer Status Report
CA Carrier Aggregation
CC Component Carrier
CG Cell Group
CMAS Commercial Mobile Alert Service
CP Cyclic Prefix
CoMP Coordinated Multi Point
C-plane Control Plane
C-RNTI Cell RNTI
CQI Channel Quality Indicator
CRC Cyclic Redundancy Check
CRS Cell-specific Reference Signal
DC Dual Connectivity
DCCH DCN Dedicated Core Network
DeNB Donor eNB
DL Downlink
DL SCH Downlink Shared CHannel
DRB Data Radio Bearer
DRX Discontinuous Reception
ECM EPS Connection Management
EMM EPS Mobility Management
eNB E-UTRAN NodeB
EMBMS Enhanced MBMS
EPC Evolved Packet Core
EPS Evolved Packet System
E-RAB E-UTRAN Radio Access Bearer
ETWS Earthquake and Tsunami Warning System
E-UTRA Evolved UTRA
E-UTRAN Evolved UTRAN
FDD Frequency Division Duplex
FDM Frequency Division Multiplexing
GERAN GSM EDGE Radio Access Network
GNSS Global Navigation Satellite System
GSM Global System for Mobile communication
GBR Guaranteed Bit Rate
GP Guard Period
G-RNTI Group RNTI
HARQ Hybrid ARQ
(H)eNB eNB or Home Enb
HFN Hyper Frame Number
HO Handover
HPLMN Home Public Land Mobile Network
HSDPA High Speed Downlink Packet Access
ID Identification or Identifier
IP Internet Protocol
LTE Long Term Evolution
LCID Logical Channel ID
MAC Medium Access Control
MBMS Multimedia Broadcast Multicast Service
MBMS GW MBMS Gateway
MBR Maximum Bit Rate
MBSFN Multimedia Broadcast multicast service Single Frequency Network
MCCH Multicast Control Channel
MCE Multi-cell/multicast Coordination Entity
MCG Master Cell Group
MCH Multicast Channel
MCS Modulation and Coding Scheme
MeNB Master eNB
MGW Media Gateway
MIB Master Information Block
MIMO Multiple Input Multiple Output
MME Mobility Management Entity
MRB MBMS Radio Bearer
M-RNTI MBMS RNTI
MSA MCH Subframe Allocation
MSI MCH Scheduling Information
MSP MCH Scheduling Period
MTCH Multicast Traffic Channel
MTC Machine-Type Communications
NACK Negative Acknowledgement
NAS Non-Access Stratum
OFDM Orthogonal Frequency Division Multiplexing
OFDMA Orthogonal Frequency Division Multiple Access
O&M Operations and Maintenances
P-GW PDN Gateway
PAPR Peak-to-Average Power Ratio
PCell Primary Cell
PDCCH Physical Downlink Control CHannel
PDCP Packet Data Convergence Protocol
PDN Packet Data Network
PDSCH Physical Downlink Shared CHannel
PDU Protocol Data Unit
PHY Physical layer
PLMN Public Land Mobile Network
ProSe Proximity based Services
PSCell Primary SCell
PUCCH Physical Uplink Control CHannel
PUSCH Physical Uplink Shared CHannel
PWS Public Warning System
QoS Quality of Service
RACH Random Access Channel
RB Radio Bearer
RF Radio Frequency
RLC Radio Link Control
RN Relay Node
RNC Radio Network Controller
RNL Radio Network Layer
RNTI Radio Network Temporary Identifier
ROHC Robust Header Compression
RRC Radio Resource Control
RRM Radio Resource Management
S-GW Serving Gateway
S1MME S1 for the control plane
SCC Secondary Component Carrier
SCell Secondary Cell
SCG Secondary Cell Group
SeNB Secondary eNB
SI System Information
SIB System Information Block
S1U S1 for the user plane
SAE System Architecture Evolution
SAP Service Access Point
SC-FDMA Single Carrier—Frequency Division Multiple Access
SC-PTM Single Cell Point To Multipoint
SCTP Stream Control Transmission Protocol
SDF SFN System Frame Number
SDU Service Data Unit
S-GW Serving GateWay SRB Signalling Radio Bearer
TCP Transmission Control Protocol
TDD Time Division Duplex
TDM Time Division Multiplexing
TMGI Temporary Mobile Group Identity
TNL Transport Network Layer
TTI Transmission Time Interval
UE User Equipment
UL Uplink
UM Unacknowledged Mode
UMTS Universal Mobile Telecommunication System
U-plane User plane
UTRA Universal Terrestrial Radio Access
UTRAN Universal Terrestrial Radio Access Network
Vehicle-to-Infrastructure
V2N Vehicle-to-Network
V2P Vehicle-to-Pedestrian
V2V Vehicle-to-Vehicle
V2X Vehicle-to-Everything
WLAN Wireless Local Area Network
X2 GW X2 GateWay
X2-C X2-Control plane
X2-U X2-User plane For the purposes of the present invention, the following terms and definitions apply.

Access Control: the process that checks whether a UE is allowed to access and to be granted services in a closed cell.

Carrier frequency: center frequency of the cell.

Cell: combination of downlink and optionally uplink resources. The linking between the carrier frequency of the downlink resources and the carrier frequency of the uplink resources is indicated in the system information transmitted on the downlink resources.

Cell Group: in dual connectivity, a group of serving cells associated with either the MeNB or the SeNB.

Dual Connectivity: mode of operation of a UE in RRC_CONNECTED, configured with a Master Cell Group and a Secondary Cell Group.

E-RAB: an E-RAB uniquely identifies the concatenation of an S1 Bearer and the corresponding Data Radio Bearer. When an E-RAB exists, there is a one-to-one mapping between this E-RAB and an EPS bearer of the Non Access Stratum as defined in [17].

Handover: procedure that changes the serving cell of a UE in RRC_CONNECTED.

Make-Before-Break HO/SeNB change: maintaining source eNB/SeNB connection after reception of RRC message for handover or change of SeNB before the initial uplink transmission to the target eNB during handover or change of SeNB.

Master Cell Group: in dual connectivity, a group of serving cells associated with the MeNB, comprising of the PCell and optionally one or more SCells.

Master eNB: in dual connectivity, the eNB which terminates at least S1-MME.

MCG bearer: in dual connectivity, a bearer whose radio protocols are only located in the MeNB to use MeNB resources only.

Power saving mode: mode configured and controlled by NAS that allows the UE to reduce its power consumption.

ProSe UE-to-Network Relay: a UE that provides functionality to support connectivity to the network for Remote UE(s).

ProSe UE-to-Network Relay Selection: Process of identifying a potential ProSe UE-to Network Relay, which can be used for connectivity services (e.g. to communicate with a PDN).

ProSe UE-to-Network Relay Reselection: process of changing previously selected ProSe UE-to-Network Relay and identifying potential a new ProSe UE-to-Network Relay, which can be used for connectivity services (e.g. to communicate with PDN).

Public Safety ProSe Carrier: carrier frequency for public safety sidelink communication and public safety sidelink discovery.

Remote UE: a ProSe-enabled Public Safety UE, that communicates with a PDN via a ProSe UE-to-Network Relay.

SCG bearer: in dual connectivity, a bearer whose radio protocols are only located in the SeNB to use SeNB resources.

Secondary Cell Group: in dual connectivity, a group of serving cells associated with the SeNB, comprising of PSCell and optionally one or more SCells.

Secondary eNB: in dual connectivity, the eNB that is providing additional radio resources for the UE but is not the Master eNB.

Sidelink: UE to UE interface for sidelink communication, V2X sidelink communication and sidelink discovery.

Sidelink communication: AS functionality enabling ProSe Direct Communication, between two or more nearby UEs, using E-UTRA technology but not traversing any network node. The terminology "sidelink communication" without "V2X" prefix only concerns PS unless specifically stated otherwise.

Split bearer: in dual connectivity, a bearer whose radio protocols are located in both the MeNB and the SeNB to use both MeNB and SeNB resources.

V2X sidelink communication: AS functionality enabling V2X Communication as defined in TS 23.285 [72], between nearby UEs, using E-UTRA technology but not traversing any network node.

FIG. 1 is a view illustrating an Evolved Packet System which is associated with the Long Term Evolution (LTE) system to which the present invention may be applied. The LTE system aims to provide seamless Internet Protocol (IP) connectivity between UE 10 and a pack data network (PDN), without any disruption to an end user's application during mobility. While the LTE system encompasses the evolution of the radio access through a Evolved Universal Terrestrial Radio Access Network (E-UTRAN) which defines radio protocol architecture between a user equipment and a BS 20, it is accompanied by the evolution of non-radio aspects under the term "System Architecture Evolution (SAE)" which includes an Evolved Packet Core (EPC) network. The LTE and SAE include an Evolved Packet System (EPS).

The EPS uses the concept of EPS bearers to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as a Core Network (CN), controls the UE and manages establishment of the bearers. As depicted in FIG. 1, the (logical or physical) node of the EPC in the SAE includes a Mobility Management Entity (MME) 30, a PDN gateway (PDN-GW or P-GW) 50, a Serving Gateway (S-GW) 40, a Policy and Charging Rules Function (PCRF) 60, a Home subscriber Server (HSS) 70, etc.

The MME 30 is the control node which processes the signaling between the UE and the CN. The protocols running between the UE and the CN are known as the Non- Access Stratum (NAS) protocols. Examples of functions supported by the MME 30 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 40 serves as the local mobility anchor for the data bearers when the UE moves between eNodeBs. All user IP packets are transferred through the S-GW 40. The S-GW 40 also retains information about the bearers when the UE is in idle state (known as ECM-IDLE) and temporarily buffers downlink data while the MME initiates paging of the UE to re-establish the bearers. Furthermore, it also serves as the mobility anchor for inter-working with other 3GPP technologies such as GPRS (General Packet Radio Service) and UMTS (Universal Mobile Telecommunications System).

The P-GW 50 serves to perform IP address allocation for the UE, as well as QoS enforcement and flow-based charging according to rules from the PCRF 60. The P-GW 50 performs QoS enforcement for Guaranteed Bit Rate (GBR) bearers. It also serves as the mobility anchor for inter-working with non-3GPP technologies such as CDMA2000 and WiMAX networks.

The PCRF 60 serves to perform policy control decision-making, as well as for controlling the flow-based charging functionalities.

The HSS 70, which is also referred to as a Home Location Register (HLR), contains users' SAE subscription data such as the EPS-subscribed QoS profile and any access restrictions for roaming. Furthermore, it also holds information about the PDNs to which the user may connect. This may be in the form of an Access Point Name (APN), which is a label according to a Domain Name system (DNS) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Hereinafter, the concept of Mobility Management (MM) and an MM back-off timer is explained in detail. The mobility management is a procedure to reduce the overhead in the E-UTRAN and processing in the UE. When the mobility management is performed, all UE-related information in the access network may be released during periods of data inactivity. This state may be referred to as EPS Connection Management IDLE (ECM-IDLE). The MME retains the UE context and the information about the established bearers during the idle periods.

To allow the network to contact UE in the ECM-IDLE, the UE updates the network as to its new location whenever it moves out of its current Tracking Area (TA). This procedure is called a "Tracking Area Update", and a similar procedure is also defined in a universal terrestrial radio access network (UTRAN) or GSM EDGE Radio Access Network (GERAN) system and is called a "Routing Area Update." The MME serves to keep track of the user location while the UE is in the ECM-IDLE state.

When there is a need to deliver downlink data to the UE in the ECM-IDLE state, the MME transmits the paging message to all BSs (i.e., eNodeBs) in its current tracking area (TA). Thereafter, eNBs start to page the UE over the radio interface. On receipt of a paging message, the UE performs a certain procedure which results in changing the UE to ECM-CONNECTED state. This procedure is called a "Service Request Procedure." UE-related information is thereby created in the E-UTRAN, and the bearers are re-established. The MME is responsible for the re-establishment of the radio bearers and updating the UE context in the eNodeB.

When the above-explained mobility management (MM) is applied, a mobility management (MM) back-off timer may be further used. In particular, the UE may transmit a Tracking Area Update (TAU) to update the TA, and the MME may reject the TAU request due to core network congestion, with a time value associated with the MM back-off timer. Upon receipt of the time value, the UE may activate the MM back-off timer.

FIG. 2 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one BS 20 which provides a control plane and a user plane to UE 10. The UE 10 may be fixed or mobile, and may be referred to as another terminology, such as an MS, a UT, an SS, an MT or a wireless device. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an Evolved Packet Core (EPC), more specifically, to an MME through S1-MME and to an S-GW through S1-U.

The EPC includes an MME, an S-GW, and a P-GW. The MME has access information of the UE or capability information of the UE, and such information is generally used for mobility management of the UE. The S-GW is a gateway having an E-UTRAN as an end point. The P-GW is a gateway having a PDN as an end point.

The layers of a radio interface protocol between the UE and the network may be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

General V2X (Vehicle-to-X)

First, terms used in V2X are defined as follows.

A Road Side Unit (RSU): a Road Side Unit (RSU) is a V2X Service enabled device that may transmit to, and receive from a moving vehicle using V2I Service.

Furthermore, the RSU is a stationary infrastructure entity supporting V2X applications that may exchange messages with other entities supporting V2X applications.

Pseudonymity: The condition when the processing of personally identifiable information (PII) is such the data may no longer be attributed to a specific subscriber without the use of additional information, as long as such additional information is kept separately and subject to technical and organizational measures to ensure non-attribution to an identified or identifiable subscriber.

The RSU is a term frequently used in existing ITS specifications, and the reason for introducing the term in the 3GPP specifications is to make the documents easier to read for the ITS industry.

The RSU is a logical entity that combines V2X application logic with the functionality of an eNB (referred to as eNB-type RSU) or UE (referred to as UE-type RSU).

V2I Service: the type of V2X Service, where one party is a vehicle whereas the other party is entity belonging to infrastructure.

V2P Service: the type of V2X Service, where one party is a vehicle whereas the other party is a device carried by an individual (e.g., handheld terminal carried by a pedestrian, cyclist, driver or passenger).

V2X Service: the type of 3GPP communication service that involves a transmission or receiving device on a vehicle.

Based on the other party involved in the communication, it may be further divided into V2V Service, V2I Service, and V2P Service.

V2X-enabled UE: UE supporting V2X Service.

V2V Service: the type of V2X Service, where both parties of the communication are vehicles.

V2V Communication Range: a direct communication range between two vehicles engaged in V2V Service.

Types of V2X Application Support

The V2X applications in the present specification, referred to as Vehicle-to-Everything (V2X), contain the following four different types:

Vehicle-to-Vehicle (V2V)
Vehicle-to-Infrastructure (V2I)
Vehicle-to-Network (V2N)
Vehicle-to-Pedestrian (V2P)

FIG. 3 illustrates Types of V2X applications to which the present invention may be applied.

These four types of V2X applications may use "cooperative awareness" to provide more intelligent services for end-users.

This means that entities, such as vehicles, roadside infrastructure, application server and pedestrians, may collect knowledge of their local environment (e.g., information received from other vehicles or sensor equipment in proximity) to process and share that knowledge in order to provide more intelligent services, such as cooperative collision warning or autonomous driving.

These intelligent transportation services and the associated message sets have been defined in automotive SDOs outside 3GPP.

Three basic classes of applications for providing ITS services: road safety, traffic efficiency, and other applications may be found in e.g., ETSI TR 102 638 V1.1.1: "Intelligent Transport Systems (ITS); Vehicular Communications; Basic Set of Applications; Definitions."

3GPP only handles the transport of these messages to support different types of V2X applications.

Vehicle-to-Vehicle (V2V) Application

V2V applications expect UEs in proximity of each other to exchange V2V application information.

3GPP transport of messages containing V2V application information requires the UE to have a valid subscription and authorization from a network operator.

Transport for a valid subscriber is provided whether the UE is served or not served by E-UTRAN.

The UE supporting V2V applications transmits messages containing V2V application information (e.g., location, dynamics, and attributes). The message payloads may be flexible in order to accommodate varying amount of information.

3GPP transport of message containing V2V application information is predominantly broadcast-based as illustrated in FIG. 10.

Such 3GPP transport includes the transport between UEs directly and/or, due to the limited direct communication range, the transport between UEs via infrastructure supporting V2X communication, e.g., RSU, application server, etc.

FIG. 4 illustrates Broadcast-based V2V communications to which the present invention may be applied.

Vehicular to Vehicular (V2V)

Three basic classes of applications for providing ITS services: road safety, traffic efficiency, and other applications may be found in ETSI Intelligent Transport System (ITS) specifications.

E-UTRAN allows such UEs that are in proximity of each other to exchange V2V-related information using E-UTRAN when permission, authorization and proximity criteria are fulfilled.

The proximity criteria may be configured by the operator.

The UE supporting V2V applications broadcasts application layer information (e.g., about its position, dynamics, and attributes as part of the V2V service). The V2V payload must be flexible in order to accommodate different information contents, and the information may be broadcasted periodically according to a configuration provided by the operator.

Vehicle-to-Infrastructure (V2I) Application

The UE supporting V2I applications transmits messages containing V2I application information to an RSU or locally relevant application server. The RSU and/or the locally relevant application server transmit messages containing V2I application information to one or more UEs supporting V2I applications.

A locally relevant application server serves a particular geographic area. There may be multiple application servers serving overlapping areas, providing the same or different applications.

Vehicle-to-Network (V2N) Application

The UE supporting V2N applications communicates with an application server supporting V2N applications. Both parties communicate with each other via EPS.

Vehicle-to-Pedestrian (V2P) Application

V2P applications expect UEs that are in proximity of each other to exchange V2P application information. 3GPP transport of messages containing V2P application information requires the UE to have a valid subscription and authorization from a network operator. Transport for a valid subscriber is provided whether the UE is served or not served by E-UTRAN.

The UE supporting V2P applications transmits messages containing V2P application information. It is expected that V2P application information may be transmitted either by UE supporting V2X application in a vehicle (e.g., warning to pedestrian), or by UE supporting V2X application associated with a vulnerable road user (e.g., warning to vehicle).

3GPP transport of messages containing V2P application information includes the transport between UEs directly and/or, due to the limited direct communication range, the transport between UEs via infrastructure supporting V2X communication, for example, an RSU or an application server.

The main difference between 3GPP transport of messages with V2P and V2V application information is due to the properties of the UE. A UE supporting V2P applications used by pedestrian might, for example, have lower battery capacity, the radio sensitivity might be limited, for example, due to antenna design, and therefore it may not be able to send messages with the same periodicity as UEs supporting V2V application, and/or receive messages.

Relative Priority of V2X Communication

Subject to regional/national regulatory requirements and operator policies, certain mission critical services (e.g., Public Safety, MPS) may be relatively prioritized over transport of V2X application information. Transport of safety-related V2X application information may be prioritized over transport of non-safety-related V2X application information.

However, in general, it is expected that operator may control relative priorities of different services.

Sidelink Communication Related Identities

Next, a description will be given of Sidelink communication and V2X Sidelink Communication related identities in which the present invention may be applied.

The following identities are used for sidelink communication:

Source Layer-2 ID: Identifies the sender of the data in sidelink communication. The Source Layer-2 ID is 24 bits long and is used together with Destination Layer-2 ID and LCID for identification of the RLC UM entity and PDCP entity in the receiver;

Destination Layer-2 ID: Identifies the target of the data in sidelink communication and V2X sidelink communication. For sidelink communication, the Destination Layer-2 ID is 24 bits long and is split in the MAC layer into two bit strings:

One bit string is the LSB part (8 bits) of Destination Layer-2 ID and forwarded to physical layer as Group Destination ID. This identifies the target of the intended data in sidelink control information and is used for filtering of packets at the physical layer.

Second bit string is the MSB part (16 bits) of the Destination Layer-2 ID and is carried within the MAC header. This is used for filtering of packets at the MAC layer.

In the case of V2X sidelink communication, Destination Layer-2 ID is not split and is carried within the MAC header.

No Access Stratum signalling is required for group formation and to configure Source Layer-2 ID, Destination Layer-2 ID and Group Destination ID in the UE.

These identities are either provided by higher layer or derived from identities provided by higher layer. In the case of groupcast and broadcast, the ProSe UE ID provided by higher layer is used directly as the Source Layer-2 ID and the ProSe Layer-2 Group ID provided by higher layer is used directly as the Destination Layer-2 ID in the MAC layer.

In the case of one-to-one communications, the ProSe UE ID and V2X sidelink communications provided by higher layer is used directly as the Source Layer-2 ID or the Destination Layer-2 ID in the MAC layer.

Support for Sidelink Communication (1) General

Sidelink communication is a mode of communication whereby UEs may communicate with each other directly over the PC5 interface. This communication mode is supported when the UE is served by E-UTRAN and when the UE is outside of E-UTRA coverage.

Only those UEs authorized to be used for public safety operation may perform sidelink communication.

In order to perform synchronization for out of coverage operation UE(s) may act as a synchronization source by transmitting SBCCH and a synchronization signal. SBCCH carries the most essential system information needed to receive other sidelink channels and signals.

SBCCH along with a synchronization signal is transmitted with a fixed periodicity of 40 ms. When the UE is in network coverage, the contents of SBCCH are derived from the parameters signaled by the eNB. When the UE is out of coverage, if the UE selects another UE as a synchronization reference, then the content of SBCCH is derived from the received SBCCH; otherwise UE uses pre-configured parameters. SIB18 provides the resource information for synchronization signal and SBCCH transmission.

There are two pre-configured subframes every 40 ms for out of coverage operation. UE receives synchronization signal and SBCCH in one subframe and transmit synchronization signal and SBCCH on another subframe if UE becomes synchronization source based on defined criterion.

UE performs sidelink communication on subframes defined over the duration of Sidelink Control period. The Sidelink Control period is the period over which resources allocated in a cell for sidelink control information and sidelink data transmissions occur. Within the Sidelink Control period the UE sends sidelink control information followed by sidelink data.

Sidelink control information indicates a Layer 1 ID and characteristics of the transmissions (e.g., an MCS, the location of resource(s) for a Sidelink Control period, and timing alignment.

The UE performs transmission and reception over Uu and PC5 with the following decreasing priority order in case Sidelink Discovery Gap is not configured:

Uu transmission/reception (highest priority);

PC5 sidelink communication transmission/reception;

PC5 sidelink discovery announcement/monitoring (lowest priority).

The UE performs transmission and reception over Uu and PC5 with the following decreasing priority order in case Sidelink Discovery Gap is configured:

Uu transmission/reception for RACH;

PC5 sidelink discovery announcement during a Sidelink Discovery Gap for transmission;

Non-RACH Uu transmission;

PC5 sidelink discovery monitoring during a Sidelink Discovery Gap for reception;

Non-RACH Uu reception;

PC5 sidelink communication transmission/reception.

(2) Radio Protocol Architecture

Hereinafter, the UE radio protocol architecture for sidelink communication is given for the user plane and the control plane.

User Plane

FIG. 5a shows the protocol stack for the user plane, where PDCP, RLC and MAC sublayers (terminate at the other UE) perform the functions listed for the user plane.

FIG. 5a illustrates user-Plane protocol stack for sidelink communication to which the present invention may be applied.

The Access Stratum protocol stack in the PC5 interface consists of PDCP, RLC, MAC and PHY as shown below in FIG. 5a.

User plane details of sidelink communication:

There is no HARQ feedback for sidelink communication;

RLC UM is used for sidelink communication;

A receiving UE needs to maintain at least one RLC UM entity per transmitting peer UE;

A receiving RLC UM entity used for sidelink communication does not need to be configured prior to reception of the first RLC UMD PDU;

ROHC Unidirectional Mode is used for header compression in PDCP for sidelink communication.

A UE may establish multiple logical channels. LCID included within the MAC subheader uniquely identifies a logical channel within the scope of one Source Layer-2 ID and Destination Layer-2 ID combination. Parameters for logical channel prioritization are not configured. The Access stratum (AS) is provided with the PPPP of a protocol data unit transmitted over PC5 interface by higher layer. There is a PPPP associated with each logical channel.

Control Plane

A UE does not establish and maintain a logical connection to receiving UEs prior to one-to-many a sidelink communication.

Higher layer establishes and maintains a logical connection for one-to-one sidelink communication including ProSe UE-to-Network Relay operation.

FIG. 5b illustrates control-Plane protocol stack for SBCCH to which the present invention may be applied.

The Access Stratum protocol stack for SBCCH in the PC5 interface consists of RRC, RLC, MAC and PHY as shown below in FIG. 11b.

The control plane for establishing, maintaining and releasing the logical connection for one-to-one sidelink communication is shown in FIG. 12.

FIG. 6 illustrates control-Plane protocol stack for one-to-one sidelink communication to which the present invention may be applied.

Support for V2X Services

Vehicular communication services, represented by V2X services, may consist of the following four different types: V2V, V2I, V2N and V2P.

Support of V2X services via PC5 interface is provided by V2X sidelink communication, which is a mode of communication whereby UEs may communicate with each other directly over the PC5 interface.

This communication mode is supported when the UE is served by E-UTRAN and when the UE is outside of E-UTRA coverage.

Only the UEs authorised to be used for V2X services may perform V2X sidelink communication.

The user plane protocol stack and functions, as specified in FIG. 5a for sidelink communication, are also used for V2X sidelink communication. In addition, for V2X sidelink communication:

STCH for sidelink communication is also used for V2X sidelink communication.

Non-V2X (e.g., Public Safety) data is not multiplexed with V2X data transmitted in resources configured for V2X sidelink communication.

Control plane protocol stack for SBCCH as specified in FIG. 11b for sidelink communication is also used for V2X sidelink communication.

The UE supporting V2X sidelink communication may operate in two modes for resource allocation:

Scheduled resource allocation, characterized by:
The UE needs to be RRC_CONNECTED in order to transmit data;
The UE requests transmission resources from the eNB. The eNB schedules transmission resources for transmission of sidelink control information and data;

UE autonomous resource selection, characterized by:
The UE on its own selects resources from resource pools and performs transport format selection to transmit sidelink control information and data;
If mapping between the zones and V2X sidelink transmission resource pools is configured, the UE selects V2X sidelink resource pool based on the zone UE is located in.

The UE performs sensing for (re)selection of sidelink resources. Based on sensing results, the UE (re)selects some specific sidelink resources and reserves multiple sidelink resources.

Up to 2 parallel independent resource reservation processes are allowed to be performed by the UE. The UE is also allowed to perform a single resource selection for its V2X sidelink transmission.

Geographical zones may be configured by the eNB or pre-configured. When zones are configured, the world is divided into geographical zones using a single fixed reference point (i.e. geographical coordinates (0, 0)), length and width.

The UE determines the zone identity by means of modulo operation using length and width of each zone, number of zones in length, number of zones in width and the single fixed reference point. The length and width of each zone, number of zones in length and number of zones in width are provided by the eNB when the UE is in coverage and pre-configured when the UE is out of coverage. The zone is configurable for both in coverage and out of coverage.

For in coverage UE, when the UE uses UE autonomous resource selection, the eNB may provide the mapping between zone(s) and V2X sidelink transmission resource pools in SIB21.

For out of coverage UEs, the mapping between the zone(s) and V2X sidelink transmission resource pools may be pre-configured. If a mapping between zone(s) and V2X sidelink transmission resource pool is (pre-)configured, the UE selects transmission sidelink resources from the resource pool corresponding to the zone where it is currently located. The zone concept is not applied to exceptional V2X sidelink transmission pools as well as reception pools. Resource pools for V2X sidelink communication are not configured based on priority.

For V2X sidelink transmission, during handover, transmission resource pool configurations including exceptional transmission resource pool for the target cell may be signaled in the handover command to reduce the transmission interruption, so that the UE may use the transmission sidelink resource pools of the target cell before the handover is completed as long as synchronization is performed with the target cell.

If the exceptional transmission resource pool is included in the handover command, the UE starts using randomly selected resources from the exceptional transmission resource pool starting from the reception of handover command. If the UE is configured with scheduled resource allocation in the handover command, the UE continues to use the exceptional transmission resource pool while the timer associated with handover is running. If the UE is configured with autonomous resource selection in the target cell the UE continues to use the exceptional transmission resource pool until the initial sensing is completed on the transmission resource pools for autonomous resource selection.

For exceptional cases (e.g., during RLF, during transition from RRC_IDLE to RRC_CONNECTED or during change of dedicated sidelink resource pools within a cell), the UE may select resources in the exceptional pool provided in serving cell's SIB21 based on sensing, and uses them temporarily.

In order to avoid interruption time in receiving V2X messages due to delay in acquiring reception pools broadcasted from the target cell, synchronization configuration and reception resource pool configuration for the target cell may be signaled to RRC_CONNECTED UEs in the handover command. For RRC_IDLE UE, it is up to UE implementation to minimize sidelink transmission/reception interruption time associated with acquisition of SIB21 of the target cell.

A UE is considered in-coverage on the carrier used for V2X sidelink communication whenever it detects a cell on that carrier as per criteria. If the UE that is authorized for V2X sidelink communication is in-coverage for V2X sidelink communication it may use scheduled resource allocation or UE autonomous resource selection as per eNB configuration.

A set of transmission and reception resource pools for data when the UE is out of coverage for V2X sidelink communication is pre-configured in the UE. V2X sidelink communication resources are not shared with other non-V2X applications transmitted over sidelink.

An RRC_CONNECTED UE may send a Sidelink UE Information message to the serving cell if it is interested in V2X communication transmission in order to request sidelink resources.

If the UE is configured by higher layers to receive V2X communication and PC5 resources are provided, the UE receives on those configured resources.

The serving cell may provide synchronization configuration for the carrier used for V2X sidelink communication. In this case, the UE follows the synchronization configuration received from serving cell. In case there is no cell detected on the carrier used for V2X sidelink communication and the UE does not receive synchronization configuration from serving cell, the UE follows preconfigured synchronization configuration. There are three types of synchronization reference, namely eNB, UE and GNSS. In case GNSS is configured as synchronization source, the UE utilizes the UTC time to calculate direct frame number and subframe number. In case eNB timing is configured as synchronization reference to the UE for dedicated carrier for V2X, the UE follows PCell (RRC_CONNECTED)/serving cell (RRC_IDLE) for synchronization and DL measurements.

General eCall

First, the terminology related to eCall is briefly summarized.

eCall: A manually or automatically initiated emergency call (TS12) from a vehicle, supplemented with a minimum set of emergency related data (MSD), as defined under the EU Commission's eSafety initiative.

eSafety: European Commission sponsored forum to improve safety aspects of European citizens.

Note: This can be applied to citizens of any country where this technology is available.

MSD: The Minimum Set of Data forming the data component of an eCall sent from a vehicle to a Public Safety Answering Point or other designated emergency call centre. The MSD has a maximum size of 140 bytes and includes, for example, vehicle identity, location information and timestamp.

MSD data frame: Uplink signal transmission interval containing the data of one MSD (after synchronization has been established)—corresponds to a time interval of 1320 ms or 10560 samples (fast modulator) and 2 320 ms or 18560 samples (robust modulator) assuming an 8 kHz sampling rate.

PSAP: Public Safety Answering Point eCall System Overview

FIG. 7 illustrates an example of the eCall system.

In the event of a vehicle collision, the eCall in-band modem solution is used in an automatically or manually established emergency voice call (E112) from the vehicle (IVS) via the cellular network to the local emergency agencies, i.e. the PSAP. The eCall modem allows to transfer a data message from the IVS over the cellular network to the PSAP which is denoted as eCall MSD. The MSD can include, e.g. vehicle location information, time stamp, number of passengers, Vehicle Identification Number (VIN), and other relevant accident information.

It is expected that the eCall MSD information will be sent either immediately following the establishment of the voice call or at any point later during the voice call. The integrity of the eCall data sent from the vehicle to the PSAP is ensured by the specified modem.

eCall is a European regional requirement. It shall not have an impact on the global circulation of terminals.

eCall System Requirements

The eCall service requirements have been defined in 3GPP Technical Specification and the following requirements are some of those defined.

The data may be sent prior to, in parallel with, or at the start of the voice component of an emergency call.

Should the PSAP request additional data then this may be possible during the established emergency call.

The realisation of the transfer of data during an emergency call shall minimise changes to the originating and transit networks.

Both the voice and data components of the emergency call shall be routed to the same PSAP or designated emergency call centre.

The transmission of the data shall be acknowledged and if necessary data shall be retransmitted.

A UE configured only to transfer data during emergency calls (e.g. eCall only UE) shall not generate signalling to the network besides what is needed to place an emergency call.

The UE shall indicate at call setup if the emergency call will carry supplementary data.

The following specific requirements are considered necessary for the satisfactory operation of the eCall service. Additionally, all existing TS12 emergency call requirements shall apply.

An eCall shall consist of a TS12 emergency call supplemented by a minimum set of emergency related data (MSD).

An eCall may be initiated automatically, for example due to a vehicle collision, or manually by the vehicle occupants.

An IVS, or other UE designed to support eCall functionality, shall include in the emergency call set-up an indication that the present call is either a Manually Initiated eCall (MIeC) or an Automatically Initiated eCall (AIeC).

The Minimum Set of Data (MSD) sent by the In vehicle System (IVS) to the network shall not exceed 140 bytes.

The MSD should typically be made available to the PSAP within 4 seconds, measured from the time when end to end connection with the PSAP is established.

Should the MSD component not be included in an eCall, or is corrupted or lost for any reason, then this shall not affect the associated TS12 emergency call speech functionality.

A call progress indication shall be provided to the user whilst the MSD transmission is in progress.

To reduce the time taken to establish an eCall an IVS whilst in eCall only mode, may receive network availability information whilst not registered on a PLMN.

Optionally, PLMNs may make use of eCall indicators, received in the emergency call set-up, to differentiate eCalls from other TS12 emergency calls.

The MIeC and AIeC may be used to filter or route eCalls to a dedicated PSAP operators.

Throughout the duration of the emergency call and following receipt of the MSD by the PSAP It shall be possible for the PSAP to send a confirmation to the IVS that the MSD has been acted upon.

It shall be possible for the PSAP to request the IVS to re-send its most recent MSD.

It shall be possible for the PSAP to instruct the IVS to terminate the eCall.

eCall Architecture

It is a challenging task to transmit data over the mobile voice channel as required of an in-band modem since speech codecs used in digital cellular systems are optimized explicitly for speech signal compression. Therefore, modem signals may incur heavy distortion after passing through the effective transmission channel consisting of speech codec, possible degradations on the radio channel, and speech decoder with error concealment. Furthermore, in digital cellular communications frame losses occur regularly and increase the burden of data recovery by the in-band modem.

The overall cellular system architecture, including the IVS and PSAP data modems, is given for information in a simplified diagram in FIG. 8.

That is, FIG. 8 illustrates an example of eCall system within cellular system architecture.

After an emergency voice call has been (automatically or manually) established, the IVS modem receiver constantly monitors the incoming signal from the speech decoder output. When prompted by a request from the PSAP operator for MSD, the IVS connects the IVS data modem transmitter to the input of the speech coder and mutes any speech from the motorist for the duration of MSD transmission to prevent it from interfering with the eCall data transmission. Alternatively, it can be the IVS that may trigger the MSD transmission. In this case, the IVS asks the PSAP to request an MSD transmission.

The first operation mode shall be referred to as the pull mode whereas the latter one is the push mode. Essentially, push mode is realized by a request from the IVS to the PSAP to pull the MSD.

Transfer of eCall Minimum Set of Data (MSD)

General Requirements

With the exception of the following specific requirements, considered necessary for the satisfactory operation of the eCall service, all existing emergency call requirements shall apply.

An eCall shall consist of an emergency call supplemented by a minimum set of emergency related data (MSD). The MSD e.g. vehicle identity, location information and other parameters.

An eCall may be initiated automatically, for example due to a vehicle collision, or manually by the vehicle occupants;

An IVS, or other UE designed to support eCall functionality, shall include in the emergency call set-up an indication that the present call is either a Manually Initiated eCall (MIeC) or an Automatically Initiated eCall (AIeC).

The Minimum Set of Data (MSD) sent by the In vehicle System (IVS) to the network shall not exceed 140 bytes;

Should the MSD component not be included in an eCall, or is corrupted or lost for any reason, then this shall not affect the associated emergency call speech functionality.

To reduce the time taken to establish an eCall an IVS whilst in eCall only mode, may receive network availability information whilst not registered on a PLMN.

PLMNs should make use of eCall indicators, received in the emergency call set-up, to differentiate eCalls from other emergency calls.

The MIeC and AIeC should be used by the serving network to filter and route eCalls to dedicated, eCall equipped, PSAPs.

The PSAP shall be given an indication that the incoming call is an eCall.

When an emergency call, other than an eCall, is routed to a PSAP that supports the eCall service, the eCall equipment shall not cause audible interference to the emergency voice call.

Throughout the duration of the emergency call and following receipt of the MSD by the PSAP It shall be possible for the PSAP to send a confirmation to the IVS that the MSD has been acted upon.

It shall be possible for the PSAP to request the IVS to re-send its most recent MSD.

It shall be possible for the PSAP to instruct the IVS to terminate the eCall.

Requirements for the Transfer of eCall MSD in a TS12 Call

The MSD should typically be made available to the PSAP within 4 seconds measured from the time when end to end connection with the PSAP is established;

A call progress indication shall be provided to the user whilst the MSD transmission is in progress.

Where the eCall indicators are not supported by the serving network, the time needed for the PSAP eCall modem to differentiate between eCalls and other TS12 calls, before routing the call to an operator, shall not exceed 2 seconds from when the IVS receives notification that the PSAP has answered the call.

When an eCall is routed to a PSAP, that does not support the eCall service, the In Vehicle System (IVS) shall not emit any audible tones for longer than 2 seconds from the time that the call is first answered.

Requirements for the Transfer of eCall Data in an IMS Emergency Call

The MSD should typically be available to the PSAP when the end to end connection with the PSAP has been established.

Additional data (i.e. data not contained in the initial MSD) may be transferred at any time during the eCall (e.g. MSD acknowledgement, resending of the MSD if requested by a PSAP).

The call setup time of an eCall shall be the same as for an IMS emergency call.

The IVS shall not emit any audible tones in order to transfer the MSD or other eCall related data.

Interworking Requirements

A PSAP, which is connected to the IMS, and supports either IMS emergency call based eCall or TS12 based eCall, shall be able to interwork with a TS12 based IVS using IMS Centralized Service, i.e. it shall be able to terminate the emergency call from the IVS, receive the MSD and request additional data from the IVS, using the eCall Modem end-to-end.

An IVS that supports IMS emergency call based eCalls shall also support TS12 based eCalls.

An IVS that supports IMS emergency call based eCalls and is attached via LTE access with no CS access available shall support the transfer of MSD via IMS emergency call to a TS12 based PSAP using the eCall Modem end-to-end.

Domain Selection

A PLMN shall indicate to an IVS whether IMS emergency call based eCalls are supported.

An IVS that supports both IMS emergency call based eCalls and TS12 based eCalls shall support domain selection for an eCall in the same way as for any other emergency call except for determining PLMN support for an IMS emergency based eCall using the PLMN indication for this.

The present specification provides a method for a specific V-UE to transmit information related to neighboring V-UEs obtained (or received) by the neighboring V-UEs through a V2X message to a PSAP via an eCall system.

In the event of accident(s) that triggers eCall (manually or automatically), the current form of MSD can send only the local information which is directly related to the vehicle itself. It is identified by the inventor(s) that there are many use cases in practice, that require additional information is necessary to follow up the accident or incidence, such as the information of vehicle(s) around this vehicle. A hit-and-run accident is one of good examples that can be helped by the use of this present invention (to be described in section 3) so that some information of vehicle(s) around this vehicle which have been collected via V2X operations, as an example, can be stored in the vehicle (for future use, e.g., download locally, or upload later when available) or can be transmitted to PSAP or to a server.

FIG. 9 illustrates an example of a situation where V-UE B got an accident that triggered an eCall.

Details on MSD

The Minimum set of Data (MSD) has been standardised by the European Committee for Standardisation.

In case of incident the public safety answering point (PSAP) receives a standardised set of data (Minimum set of data—MSD) including the following information (this list is not exhaustive):

Message identifier: MSD format version (later versions to be backwards compatible with existing versions).

Activation: whether the eCall has been manually or automatically generated

Call type: whether the eCall is real emergency or test call

Vehicle type: passenger Vehicle, buses and coaches, light commercial vehicles, heavy duty vehicles, motorcycles Vehicle identification number (VIN)

Vehicle propulsion storage type: This is important particularly relating to fire risk and electrical power source issues (e.g. Gasoline tank, Diesel tank, Compressed natural gas (CNG), etc.)

Time stamp: Timestamp of incident event

Vehicle location: determined by the on-board system at the time of message generation. It is the last known vehicle's position (latitude and longitude)

Confidence in position: this bit is to be set to "Low confidence in position" if the position is not within the limits of +/−150 m with 95% confidence Direction: helpful to determine the carriageway vehicle was using at the moment of the incident Recent vehicle location n (Optional): vehicle's position in (n-1) and (n-2)

Number of passengers (Optional): number of fastened seatbelts

Optional additional data (Optional): in some cases, optional data may be available in the MSD (at the vehicle manufacturer discretion). This data incorporate a tag for the identification in the beginning of the optional data (type and structure identification). This data will be registered and maintained. PSAP will have free access such data registry data.

FIG. 10 is a flowchart illustrating an example of a method for transmitting information related to neighboring vehicles through eCall.

First, a V-UE1 receives a V2X message from neighboring V-UEs (V-UE2, V-UE3, . . . , V-UEn) (S1001).

The V2X message may be, for example, a CAM, a DEMN message, or the like.

Next, the V-UE1 may store the V2X message received from the neighboring V-UEs in a (specific) list for T seconds (S1002).

Here, the T seconds may have different values for each country.

That is, the T value may be a value indicating a time for storing information received from neighboring vehicles regulated in each country.

The V-UE1 may delete the list in which the V2X message is stored if T seconds have elapsed (S1003).

Thereafter, it is assumed that an accident has occurred to V-UE1. That is, if the V-UE1 detects that an accident has occurred (S1004), the V-UE1 keeps the V2X messages received from the neighboring V-UEs currently stored in the list (S1005).

Specifically, the V-UE1 continuously stores the V2X messages received from the neighboring V-UEs in the list for the (next) S second after the occurrence of the accident (S1005).

Then, the V-UE1 processes the pV2X message through the received and stored V2X messages (S1006).

The pV2X message is generated by extracting (or selecting) specific information from the received and stored V2X messages.

The pV2X message includes information of another vehicle. The information of the other vehicle may be a V2X application layer ID, a UE-related ID, etc., if available.

Here, the UE may be one of the witnesses or one of the persons involved in the accident.

Here, the V-UE1 stores other information not included in the pV2X message (S1006).

Then, the V-UE1 confirms whether the processed pV2X message is ready to be transmitted (S1007).

If the pV2X message is ready to be transmitted, the V-UE1 transmits the pV2X message to the PSAP together with the eCall (voice) and/or the MSD (S1009).

Here, the pV2X message and the eCall (voice) and/or the MSD may be transmitted through the same session or the same bearer or the same channel.

If it is determined that the pV2X message is not ready to be transmitted, the V-UE1 transmits eCall (voice) and/or MSD to the PSAP without the pV2X message (S1008).

In this case, the transmission of the pV2X message from the V-UE1 to the PSAP may be performed together in step S1010 (additional information request).

Then, the PSAP determines whether it is necessary to receive additional information from the V-UE1 (S1010).

If it is determined that the PSAP needs to receive additional information from the V-UE1, the PSAP requests additional transmission of the pV2X message to the V-UE1 (S1011).

Then, the V-UE1 brings up (or copies) other information not included in the pV2X message of step S1006, and generates a pV2Xa message (S1012).

Step S1012 is performed when the other information is not empty (or if it exists).

Here, 'copy' or 'bring up' or 'carry' means to transfer or bring information in an application layer to a transport layer.

Then, the V-UE1 checks whether the pV2Xa message is empty (or exists) (S1013).

If it is determined that the pV2Xa message is not empty (or the pV2Xa message exists), the V-UE1 transmits the pV2Xa message to the PSAP (S1014).

FIG. 11 is another flowchart illustrating an example of a method for transmitting information related to neighboring vehicles through eCall.

That is, FIG. 11 shows a method of transmitting a pv2X message in response to a PSAP request.

First, a V-UE1 transmits eCall (voice) and/or MSD to a PSAP (S1101).

In step S1101, information indicating whether an accident has occurred in the V-UE1 may be included.

Then, the PSAP requests information on the neighboring vehicle of the V-UE 1 to the V-UE 1 based on the information received in step S1101.

If the PSAP determines that an accident has occurred to the V-UE1 in step S1101, the PSAP can notify the V-UE1 of (1) information about nearby vehicle received from the nearby vehicle for a certain period of time before the accident occurred, and/or (2) information about the nearby vehicle received from the nearby vehicle for a predetermined time after the accident occurred.

Then, the V-UE1 can generate a pV2X message by extracting (or selecting) some information from the V2X messages received from the neighboring vehicle (s) (S1103).

The Step S1103 may be performed selectively.

Then, the V-UE1 transmits all of the V2X messages received from the neighbor vehicle (s) to the PASP or transmits the pV2X message to the PSAP (S1104).

Here, if the V-UE1 transmits the pV2X message to the PSAP, the steps S1010 through S1014 shown in FIG. 10 may be additionally performed.

FIG. 12 is a block diagram illustrating an example of a method for transmitting information related to neighboring vehicles through eCall.

At first, a first vehicle UE (or V-UE1) receives a first V2X message from at least one the neighboring vehicle UE (S1201).

Thereafter, the first vehicle UE generates a second V2X message based on the received first V2X message when an accident triggering an eCall (emergency call) occurs (S1202).

Here, the second V2X message includes a part of the first V2X message and control information associated with the at least one neighboring vehicle UE.

And, the control information includes at least one of an identifier (ID) that identifies a V2X application layer or an identifier (ID) that identifies the at least one neighboring vehicle UE.

Thereafter, the first vehicle UE checks whether the second V2X message is ready to be transmitted to the first network entity (S1203).

Thereafter, the first vehicle UE transmits at least one of the eCall, a minimum set of data (MSD) forming the data component of the eCall, or the second V2X message to the first network entity according to the result of the check (S1204).

In the step S1204, if the second V2X message is not ready to be transmitted, the eCall and the MSD are transmitted to the first network entity.

Or, in the step S1204, if the second V2X message is ready to be transmitted, the eCall, the MSD and the second V2X message are transmitted to the first network entity.

Furthermore, the first vehicle UE can store the received first V2X message in a specific list for a first time.

Also, the first vehicle UE can delete the V2X message stored in the specific list after the first time.

Also, after the step S1201, the first vehicle UE can copy the first V2X message stored in the specific list.

Here, the second V2X message is generated based on the copied first V2X message.

Also, the first vehicle UE can maintain the first V2X message stored in the specific list for a second time from the time an accident happened.

Also, the first vehicle UE can store other information included in the received first V2X message except for the part of information included in the received first V2X message.

After the step S1204, the first vehicle UE can receive a request message requesting additional information associated with the second V2X message from the first network entity.

After the first vehicle UE receives the request message, the first vehicle UE generates a third V2X message including the other information if the stored other information exists.

Also, after the first vehicle UE generates the third V2X message, the first vehicle UE can transmit the generated third V2X message to the first network entity(S).

Here, the step of generating the third V2X message can further comprise a step of copying the other information, and a step of generating the third V2X message using the copied other information.

Here, the first network entity is a Public Safety Answering Point (PSAP).

Here, the minimum set of data (MSD) includes at least one of a vehicle identification number (VIN) identifying a vehicle UE, vehicle location information indicating the location of the vehicle UE, or time stamp information related to the time of occurrence of the accident.

General Apparatus to which an Embodiment of the Present Invention May be Applied FIG. 13 is a block diagram illustrating a wireless device in which methods as proposed herein may be implemented.

In this case, the wireless device may be a BS, UE, vehicle UE, a network entity (or PSAP), and the network entity includes at least one of eNB-type RSU or MME.

As shown in FIG. 13, the network entity 1310 and the UE (or the vehicle UE) 1320 include communication units (transmitting/receiving units, RF units, 1313 and 1323), processors 1311 and 1321, and memories 1312 and 1322.

The network entity and the UE may further input units and output units.

The communication units 1313 and 1323, the processors 1311 and 1321, the input units, the output units, and the memories 1312 and 1322 are operatively connected with each other in order to conduct the methods as proposed herein.

The communication units (transmitting/receiving units or RF units, 1313 and 1323), when receiving information created from a Physical Layer (PHY) protocol, transfer the received information through Radio Frequency (RF) spectrums and conduct filtering and amplification, then transmit the results through antennas.

Furthermore, the communication units transfer Radio Frequency (RF) signals received through the antennas to bands capable of being processed by the PHY protocol, and perform filtering.

However, the communication units may also include the functions of switches to switch transmitting and receiving functions.

The processors 1311 and 1321 implement functions, procedures, and/or methods as proposed herein. The layers of radio interface protocols may be implemented by the processors.

The processors may be represented as control parts, controllers, control units, or computers.

The memories 1312 and 1322 are connected with the processors to store protocols or parameters for tracking a location vehicle UE.

The processor may include an application-specific integrated circuit (ASIC), a separate chipset, a logic circuit, and/or a data processing unit. The memory may include read-only memory (ROM), random access memory (RAM), flash memory, memory cards, storage media and/or other equivalent storage devices. The RF unit may include a base-band circuit for processing a radio signal. When the embodiment of the present invention is implemented in software, the aforementioned methods may be implemented with a module (or a process or a function) for performing the aforementioned functions. The module may be stored in the memory and may be performed by the processor. The memory may be located inside or outside the processor, and may be coupled to the processor by using various well-known means.)

The output unit (display unit) is controlled by the processor and outputs information from the process, together with various information signals from the processor and key input signals generated from the key input unit.

Furthermore, although the drawings have been individually described for ease of description, the embodiments shown in the drawings may be merged with each other to implement new embodiments. As necessary by one of ordinary skill, designing recording media readably by a computer recording programs to execute the above-described embodiments also belongs to the scope of the present invention.

Meanwhile, the tracking a location procedure as described herein may be implemented as processor-readable codes in a recording medium that may be read by a processor provided in a network device.

The process readable recording media include all types of recording devices storing data that is readable by the processor. Examples of the recording media readable by the process include ROMs, RAMs, CD-ROMs, magnetic tapes, floppy discs, optical data storage devices, etc., and may be further implemented in the form of carrier waves such as transmitted over the Internet.

Furthermore, the recording media readable by the processor may be distributed to computer systems connected with each other via a network, and processor readable codes may be stored and executed in a distributing manner.

This disclosure lies in tracking a location procedure in a V2X communication system.

INDUSTRIAL APPLICABILITY

Examples in which the method for transceiving information for a neighboring vehicle UE of a first vehicle UE using V2X (Vehicle-to-X) communication in a wireless communication system according to an embodiment of the present invention has been applied to 3GPP LTE/LTE-A systems have been described, but the method may be applied to various wireless communication systems in addition to the 3GPP LTE/LTE-A systems.

The invention claimed is:

1. A method for transmitting, by a first vehicle UE (User Equipment), information for a neighboring vehicle UE of the first vehicle UE using V2X (Vehicle-to-Everything) communication in a wireless communication system, the method comprising:
    receiving a first V2X message from at least one neighboring vehicle UE;
    generating a second V2X message based on the received first V2X message when an accident triggering an eCall (emergency call) occurs,
    wherein the second V2X message includes a part of the received first V2X message and control information associated with the at least one neighboring vehicle UE,
    wherein the control information includes at least one of an identifier (ID) identifying a V2X application layer or an identifier (ID) identifying the at least one neighboring vehicle UE;
    checking whether the second V2X message is ready to be transmitted to a first network entity;
    transmitting the eCall and a minimum set of data (MSD) forming a data component of the eCall to the first network entity where the second V2X message is not ready to be transmitted according to the result of the check, and
    transmitting the eCall, the MSD and the second V2X message to the first network entity where the second V2X message is ready to be transmitted according to the result of the check.

2. The method of claim 1, further comprising:
storing the received first V2X message in a specific list for a first period of time.

3. The method of claim 2, further comprising:
deleting the V2X message stored in the specific list after the first period of time.

4. The method of claim 3, further comprising:
copying the first V2X message stored in the specific list, wherein the second V2X message is generated based on the copied first V2X message.

5. The method of claim 4, further comprising:
maintaining the first V2X message stored in the specific list for a second period of time from the time an accident happened.

6. The method of claim 2, further comprising:
storing other information included in the received first V2X message, but not including the part of the received first V2X message included in the second V2X message.

7. The method of claim 6, further comprising:
receiving a request message requesting additional information associated with the second V2X message from the first network entity.

8. The method of claim 7, further comprising:
generating a third V2X message including the other information if the stored other information exists; and transmitting the generated third V2X message to the first network entity.

9. The method of claim 8, wherein generating the third V2X message comprises:
copying the other information; and
generating the third V2X message using the copied other information.

10. The method of claim 2, wherein the first network entity is a Public Safety Answering Point (PSAP).

11. The method of claim 2, wherein the MSD includes at least one of a vehicle identification number (VIN) identifying the first vehicle UE, vehicle location information indicating a location of the first vehicle UE, or time stamp information related to a time of occurrence of the accident or event.

12. A first vehicle UE (User Equipment) for transmitting information for a neighboring vehicle UE of a first vehicle UE using V2X (Vehicle-to-Everything) communication in a wireless communication system, comprising:

one or more antennas for transceiving a radio signal; and
a processor functionally connected to the one or more antennas,
wherein the processor is configured:
to receive a first V2X message from at least one neighboring vehicle UE,
to generate a second V2X message based on the received first V2X message when an accident triggering an eCall (emergency call) occurs,
wherein the second V2X message includes a part of the received first V2X message and control information associated with the at least one neighboring vehicle UE,
wherein the control information includes at least one of an identifier (ID) identifying a V2X application layer or an identifier (ID) identifying the at least one neighboring vehicle UE;
to check whether the second V2X message is ready to be transmitted to a first network entity,
to transmit the eCall and a minimum set of data (MSD) forming a data component of the eCall to the first network entity where the second V2X message is not ready to be transmitted according to the result of the check, and
to transmit the eCall, the MSD and the second V2X message are transmitted to the first network entity where the second V2X message is ready to be transmitted according to the result of the check.

* * * * *